July 18, 1950     O. A. HUNT ET AL     2,515,648
STEAM SYSTEM CONTROL

Filed Feb. 28, 1949     3 Sheets-Sheet 2

FIG-2

Inventors.
Louin Tiller &
Orville A. Hunt
By: Jacob W. Roberts
Atty.

Patented July 18, 1950

2,515,648

UNITED STATES PATENT OFFICE 2,515,648

STEAM SYSTEM CONTROL

Orville A. Hunt and Louin Tiller, Chicago, Ill., assignors, by mesne assignments, to Reconstruction Finance Corporation, Chicago, Ill., a corporation of the United States Application February 28, 1949, Serial No. 78,842

21 Claims. (Cl. 237—9)

Our invention relates to steam systems for drying or heating operations and pertains particularly to controls for such systems operating on the return ends of the systems for such purposes as maintaining flow velocity and handling condensate as well as deaerating and preheating make-up water.

The present application is a continuation-in-part of our previous application S. N. 762,628, entitled Steam System, filed July 22, 1947, and our previous application S. N. 764,454, entitled Steam System Control, filed July 29, 1947, both of which are abandoned. Both of these previous disclosures are incorporated in the present disclosure by reference insofar as consistent therewith.

Other copending applications disclosing the subject matter related hereto are: S. N. 78,605, filed February 26, 1949; S. N. 78,843, filed February 28, 1949; S. N. 78,604, filed February 26, 1949; S. N. 80,802, filed February 28, 1949; and S. N. 777,894, filed October 4, 1947.

A steam system of the type here under consideration may be termed a "clear channel" system, meaning that a clear channel (no traps) exists from the boiler through the equipment to the return line. Such a clear channel makes the whole system "responsive" in the sense that a drop in pressure at the end of the return line causes an immediate velocity response throughout all the equipment. This fact is important because it makes possible velocity control for the whole system at a single point at the end of the return line.

The general object of the invention is to control the flow velocity throughout the steam system with high efficiency, to effect certain economies in the handling of condensate and in the preheating and deaerating of make-up water, and to accomplish these purposes by means of a compact automatic master control that may be manufactured as a self-contained packaged unit for incorporation in existing steam systems.

It is old to create such a pressure differential and consequent velocity response solely by opening a valve at the end of the return line, as disclosed in the above-mentioned patent, the released fluid being utilized to preheat and deaerate make-up water for the boiler. But while such a valve arrangement used alone is highly effective and has been commercially successful, nevertheless in some situations it presents certain problems in economy and efficiency, which problems, we find, can be solved by adding other ways of promoting velocity and of utilizing steam at the return end of the system.

The broad object of the present invention is to provide such solutions by certain actions at the end of the return line. One such action is the removal of condensate under pressure from the return line above the release valve for direct return to the boiler. This action of course has a flow-promoting effect on the responsive clear-channel system. Another action is the condensing of steam in the return line above the release valve. This action, too, supplements the flow-promoting effect of the release valve and in addition consumes steam in the return line. Other actions include cooling actions taking place in a receiver at the end of the return line, the release valve being adapted to open in response to such cooling. These various actions are combined with the action of the release valve in various ways in various practices of the invention.

Some of the objects of the invention are largely attained by using a release valve at the end of the return line that responds to the heating and cooling of a thermostat. The thermostat is raised in temperature by heat derived from the return line and may be positioned either upstream from the release valve for direct and immediate heating by the fluid in the return line, or may be positioned downstream from the valve to be heated by the return-line fluid discharged from the valve.

If the thermostat that controls the release valve is positioned upstream from the valve, it is adapted to cause opening action of the valve in response to rising temperature in the return line and closing action in response to dropping temperature. On the other hand, if the controlling thermostat is positioned downstream from the release valve, it is adapted to cause closing action of the valve in response to temperature rise and opening action in response to temperature drop. In both cases the effect is to cause the valve to operate automatically for maintaining a pressure drop across the system sufficient for whatever velocity level is desirable in the system.

When the thermostat is above the valve, the provision of means to remove condensate continually from the return line insures that the thermostat will not be unduly affected by accumulated low temperature condensate, especially in systems having long return lines.

The thermostat, whether above the release valve or below the release valve, is always set to cause operation of the release valve at some temperature below the temperature of the steam supply of the system and therefore causes and predetermines flow of a desired velocity from the steam supply through the equipment back to the boiler. The result is controlled operation of the whole steam system with sustained high level heat output to the material in process.

An important advantage and object of our invention is the combining of the advantages of an open steam system with the advantages of a closed steam system. The release valve at the end of our steam system can set up a high-pressure differential across the system for flow promotion in the same manner as an open steam system; and on the other hand, the removal of the condensate from the system upstream from the valve makes it possible to keep the condensate under pressure and return the condensate to the boiler at a high temperature characteristic of closed steam systems.

A further object of the preferred practice of the invention is not only to promote velocity in the system by pressure drop at the end of the return line, but also to deliver the make-up water to the boiler at a higher temperature than possible in any conventional steam system. This dual object is accomplished by transferring heat from the return line to the make-up water as the make-up water travels from the usual feed pump to the boiler. Thus the make-up water causes condensation in the return line to promote flow velocity in the system and at the same time is itself raised to a high temperature on the order of 300° F. It is possible to heat the make-up water to this high temperature and to do so without creating any pumping problem because the additional heating occurs on the discharge side of the feed pump where the water is under high pressure.

Figure 1:
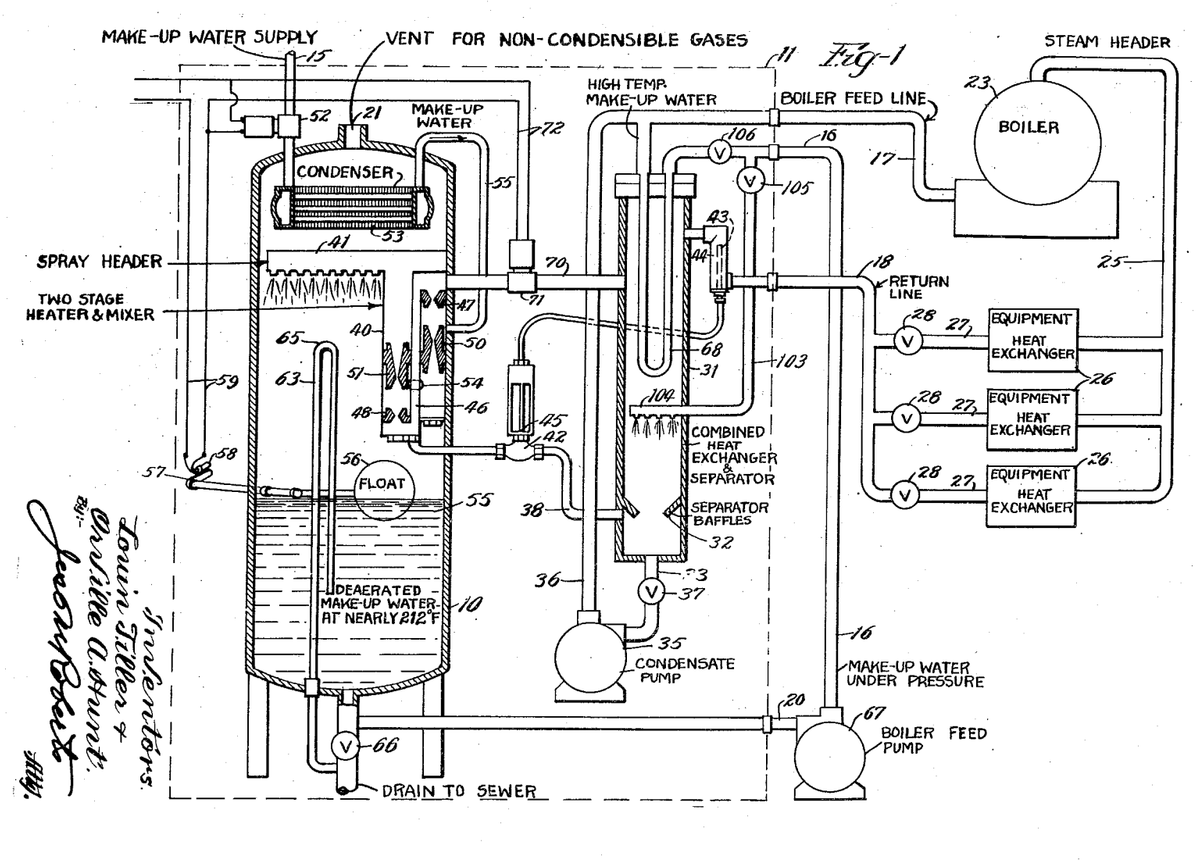
Fig. 1 is a diagram of a representative steam system incorporating the new control unit.

The above and other objects and advantages of the invention will be apparent from the following description taken with the accompanying drawings. In the drawings, which are to be considered as merely illustrative:

Fig. 1 shows diagrammatically the principal elements of a typical steam system under the control of the particular form of the new master control unit that has the thermostat upstream from the release valve that it controls.

The control unit includes an upright tank or receiver 10 and various other elements to be described, all of which are by preference enclosed in a housing or casing represented by the rectangle 11 shown in broken lines. In other words, the rectangle 11 represents a self-contained unit.

Fig. 1 shows five important pipes connected to the master control unit: a pipe 15 for supplying new water to the unit; a pipe 16 connected to the discharge side of the usual boiler feed pump; a pipe 17 which is the boiler feed line for supplying water to the boiler; the return line 18 of the steam system, and, at a lower level, a pipe 20 to the intake side of the boiler feed pump. If desired, an additional vent pipe (not shown) may be connected to the vent opening 21 of the tank 10. In some practices of the invention the tank 10 will be maintained above atmospheric pressure but, of course, below the pressure of the return line 18.

In the steam system shown in Fig. 1, steam from a boiler 23 is supplied through a header 25 to a plurality of equipment heat exchangers or steam-using devices 26. Such devices may be, for example, the various machines in a laundry or the drying equipment used in paper manufacture, plastics, etc. Return pipes 27 from the various pieces of equipment connect with the previously mentioned return line 18.

Figure 2:
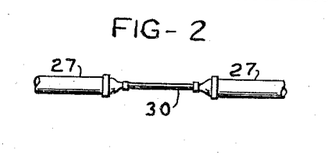
Fig. 2 is a fragmentary view of a restriction that may be substituted in Fig. 1.

Each of the return pipes 27 is provided with a suitable restriction such as an adjustable valve 28 instead of a conventional steam trap. Other types of restrictions may be employed. For example, in some practices of the invention small diameter pipes are placed in the return lines as indicated at 30 in Fig. 2. It is contemplated that in all instances where orifices or restrictions are used instead of traps, there will be open communication from the return line 18 back through the various pieces of equipment 26 to the steam supply so that the lowering of pressure in the return line 18 will cause velocity response in each of the steam-using devices.

Preferably, condensate is continuously or continually removed from the return line 18 and the return line is suitably designed to facilitate such removal. For example, the return line may be arranged to cause the condensate to gravitate to a point for collection and removal and in addition may be enlarged in cross section near the collection point to favor separation of the condensate from steam in the return line.

In the particular arrangement shown in Fig. 1 by way of example, the return line 18 includes as a part thereof a steam separator 31 which preferably, but not necessarily, also serves as a heat exchanger for using the returns of the system to heat new make-up water. If desired, suitable baffles 32 may be provided in the separator 31 to facilitate separation of the steam and condensate.

In the preferred practice of the invention condensate that is separated from the steam gravitates through a pipe 33 to the intake side of a condensate pump 35 that is included in the working parts of the master control unit. The pump 35 discharges the condensate upward through a pipe 36. It is contemplated that the pump 35 will operate continuously but in some practices of the invention the pump may operate only periodically, for example, in response to fall in the water level in the boiler 23.

A valve 37 is provided in the pipe 33 to cut the heat exchanger off from the pump if and when desired. When the valve 37 is closed all of the condensate and steam that reaches the separator 31 must flow from the separator through a pipe 38. The pipe 38 conducts fluid from the return line 18 into the receiver tank 10 and is in effect a continuation of the return line 18.

The pipe 38 leads to a two-stage combined heater and mixer 40 which in turn communicates with a spray head 41 having numerous downwardly directed spray ports. Flow through the pipe 38 into the tank 10 is controlled by a thermostatic release valve 42 having a thermostat bulb 43 extending into the return line 18 upstream from the separator 31. Fig. 1 shows the thermostat bulb 43 extending into a special fitting 44 that is included in the return line 18. The thermostatic control is such that valve 42 opens in response to increase in temperature of the thermostat bulb 43 and closes in response to decreasing temperature of the bulb. The critical temperature at which the valve opens and closes may be varied by virtue of a manual adjustment 45 on the thermostatic valve 42.

The steam or steam mixed with some condensate that flows through the pipe 38 and the valve 42 enters a central upright passage 46 in the two-stage heater 40 and divides, one portion flowing into an upper jet 47 for the first-stage heating of new water, and the other portion flowing into a lower jet 48 for the second-stage heating. The upper jet 47 is directed into a venturi throat 50 and the lower jet 48 is directed into a corresponding venturi throat 51, each jet and throat forming a low pressure space for the introduction of fluid.

New water for the steam system from the previously mentioned supply pipe 15 passes through a solenoid valve 52 and through a vent condenser 53 to a pipe 55 that enters the two-stage heater 40 in the low-pressure space between the first jet 47 and venturi throat 50. The valve 52 may be in the pipe 55 instead of in the pipe 15, if desired. The resulting mixture from the venturi throat 50 flows through a lateral connection passage 54 into the low-pressure space between the second jet 48 and the second venturi throat 51, where it is joined by the second portion of hot fluid from the pipe 38. From the two-stage heater 40 the fluid flows into the spray head 41. The new water is not only heated by the addition of the steam or condensate from the return line but is also under considerable pressure in the spray head 41, and is discharged downwardly through the spray ports with considerable violence.

When the water at high pressure and heated substantially above 212° F. is released in finely divided particles from the spray head 41 into the interior of the tank 10, the water particles are shattered by flashing action and the non-condensible gases are effectively released from the water to escape upwardly through the vent opening 21. The vent condenser 53 not only reclaims heat from the escaping gases but also condenses any vapors that tend to escape with the gases, the recovered condensate dripping to the bottom of the tank.

It is contemplated that the spray capacity of the spray head 41 will be so limited relative to the input of fluid that the pressure in the spray head will rise above the pressure prevailing in the tank 10 when the thermostatic valve 42 is open. Under such conditions, the pressure in the spray head may go substantially above the tank pressure. It is further contemplated that the extent to which pressure will rise in the spray head under given conditions may be varied either by varying the number of spray openings or changing the size of the spray openings.

The tank 10 contains in its lower portion a reserve body 55 of the deaerated make-up water supplied by the above-described spray action. When the level of this body drops, a suitable float 56 opens the previously mentioned solenoid valve 52 by means of a suitable electrical arrangement. In the particular construction shown, the float actuates an external rocker arm 57 on which is mounted a suitable mercury switch 58. The mercury switch 58, which closes when the float 56 drops, is part of an electrical circuit represented by two wires 59 for energizing and opening the solenoid valve 52.

If the level of the water body 55 rises too high, it overflows through an overflow pipe 63. The overflow pipe 63 is formed into a loop with a submerged end to prevent excessive escape of vapor through the pipe, but the loop is provided with a small vent aperture 65 to prevent siphon action. When desired, the tank may be drained by opening a drain valve 66.

The deaerated make-up water at nearly 212° F. temperature is taken from the tank 10 through the previously mentioned pipe 20 to the intake side of the usual boiler feed pump 67 and is discharged by the pump into the previously mentioned pipe 16 that is connected to the control unit at the top. The pipe 16 is connected to the inlet end of a heat-exchange coil 68 in the previously mentioned steam separator 31. The outlet end of this coil 68 is joined to the previously mentioned pipe 36 from the condensate pump 35 to supply the previously mentioned boiler feed line 17 as shown in Fig. 1. It is apparent that the pressure on the outlet side of the condensate pump 35 is greater than the prevailing pressure in the return line 18.

When make-up water is pumped through the coil 68 by the boiler feed pump 67, the make-up water being substantially below the temperature of the interior of the separator 31 causes steam in the separator to condense. This condensing action creates velocity throughout the system by the contraction involved in the change of state from vapor to liquid. The cooling action also may affect the fluid in the vicinity of the bulb 43 to favor opening action of the thermostatic valve 42. For further condensing action inside the separator 31 to create velocity in the system, make-up water may be introduced directly into the separator. For this purpose a pipe 103 may branch from the pipe in the unit that connects to the previously mentioned pipe 16. The pipe 16, as previously mentioned, delivers make-up water to the coil 68 in the separator 31. The pipe 103 diverts a portion of the make-up water to a spray head 104 inside the separator. Preferably, valves 105 and 106 are provided for adjustment to vary the proportion of make-up water that is diverted to the spray head 104.

The feed pump 67 may be controlled in a well known manner by means responsive to changes in the water level in the boiler 23 or in some practices of the invention may be manually adjusted to run continuously at approximately the rate required to keep the boiler level constant. In either event, the float 61 in the master control tank 10 will drop periodically to cause new water to be supplied to the system in accord with the boiler demand.

For proper performance of the described deaeration operation fluid must be released from the return line 18 into the master control tank 10 simultaneously with the flow of water into the tank from the pipe 15. To this end, a pipe 70 from the separator 31 communicates with the upper end of the passage 46 in the two-stage heater 40, in one practice of the invention as shown in Fig. 1. Flow through this second release pipe 70 is controlled by a solenoid steam valve 71, which valve is connected in parallel with the previously mentioned solenoid valve 52 by a pair of wires 72. Whenever the solenoid valve 52 for water flow opens in response to lowering of the float 56, the solenoid valve 71 for steam flow opens at the same time.

Operation of the steam system shown in Fig. 1

The manner in which the described steam system operates and is controlled by the described unit may be readily understood from the foregoing description.

Steam condenses in each one of the steam chests in the pieces of equipment 26 to give up heat to the material in process, but a portion of the steam flows continuously into the return line 18 through the restrictions 28 because of the open communication through the system. In this method of operation, the flow velocity is substantially higher than the overall or average velocity in a conventional trap system and the small proportion of steam that is continuously passing through the restrictions 28 effectively carries the condensate out of the steam chests along with non-condensible gases. The drop in pressure causes a small portion of the condensate to flash into steam thereby slightly increasing the steam content of the fluid mixture that reaches the combined heat exchanger and separator 31.

At the master control unit four major causes are in effect for sustaining flow velocity throughout the steam system. In the first place, the continuous removal of condensate by the pump 35 from the lower end of the separator 31 creates flow in the return line. In the second place, the condensing of steam in the separator 31 by the cooling effect of the water coil 68 and/or the cooling effect of water introduced by the spray head 104, serves to promote flow by contraction of the fluid mixture at the end of the return line. In the third place, the release of steam or steam mixed with condensate, by opening of the thermostatic valve 42 causes flow throughout the system. And, in the fourth place, the release of steam from the return line by opening of the solenoid steam valve 71 likewise causes flow throughout the system.

A special advantage of pumping feed water through the heat exchanger coil 68 is that the water in the coil 68 is under high pressure and is therefore capable of absorbing more B. t. u.'s from the return line than would otherwise be possible. This arrangement which raises the steam-condensing capacity of a given quantity of the make-up water to the maximum is especially valuable in a steam system having a relatively low make-up water demand.

Although opening the thermostatic valve 42 to create velocity may tend to lower the pressure of the condensate delivered to the condensate pump 35, the valve opens only intermittently so that such tendency to drop pressure can occur only intermittently.

The adjustment 45 of the thermostatic valve 42 is at a temperature value sufficiently below the temperature prevailing in the steam header 25 to insure any desired minimum velocity of flow through the system. In a laundry installation, for example, where the boiler supplies steam at a constant gauge pressure of 100 pounds per square inch, the temperature prevailing in the steam header will be approximately 337° F. In such an instance the adjustment 45 of the thermostatic valve 42 may be set to cause opening operation of the valve at approximately 6° lower than the temperature in the steam header 25 or at approximately 331° F. The result will be a pressure drop of approximately 10 pounds from the boiler 23 to the end of the return line 18. Such a pressure drop insures sufficient flow velocity for maintaining a high rate of steam output to the material in process.

When both the thermostatic valve 42 and the solenoid valve 71 are closed, the operation of the pump 35 in continually removing condensate from the return line will tend to keep the return line pressure relatively low. The pumping of make-up water from the tank 19 through the heat-exchange coils 68 by the boiler feed pump 67 will also tend to keep the pressure of the return line down by condensing steam inside the separator 31.

Whenever the pressure in the return line rises to within approximately 10 pounds of the pressure prevailing in the steam header 25, the temperature in the return line will climb above 331° F. whereupon the heating of the thermostat bulb 43 will automatically cause the thermostatic valve 42 to open for release of steam from the return line. Whenever the thermostatic valve 42 opens the temperature in the return line goes down and the thermostatic valve 42 automatically closes. Thus the thermostatic valve 42 automatically maintains any desired pressure drop between the boiler and the return end of the system.

Whenever new water is demanded by the system, the float 56 drops to cause energization of the solenoid valve 52 for introducing new water, and the float also causes simultaneous energization of the solenoid valve 71 for concurrent flow of steam into the two-stage heater 40. Ordinarily both the thermostatic valve 42 and the solenoid valve 71 cannot stay open simultaneously, because under such conditions the temperature in the return line 18 necessarily drops below the temperature setting of the thermostat control thereby causing the thermostatic valve 42 to remain closed. Consequently, whenever the master control unit takes in new water, steam is released from the return line of the system only through the pipe 70 under control of the solenoid steam valve 71. There would be no particular harm, however, in both steam valves 42 and 71 being open at one time.

The thermostat valve 42 may completely close or only nearly close in response to dropping temperature, and the valve may be either a quick-acting valve or a slow-acting valve. The solenoid valve 71 may also completely close or only nearly close when the control circuit energized by the mercury switch 58 is de-energized.

Figures 3, 4, 5:
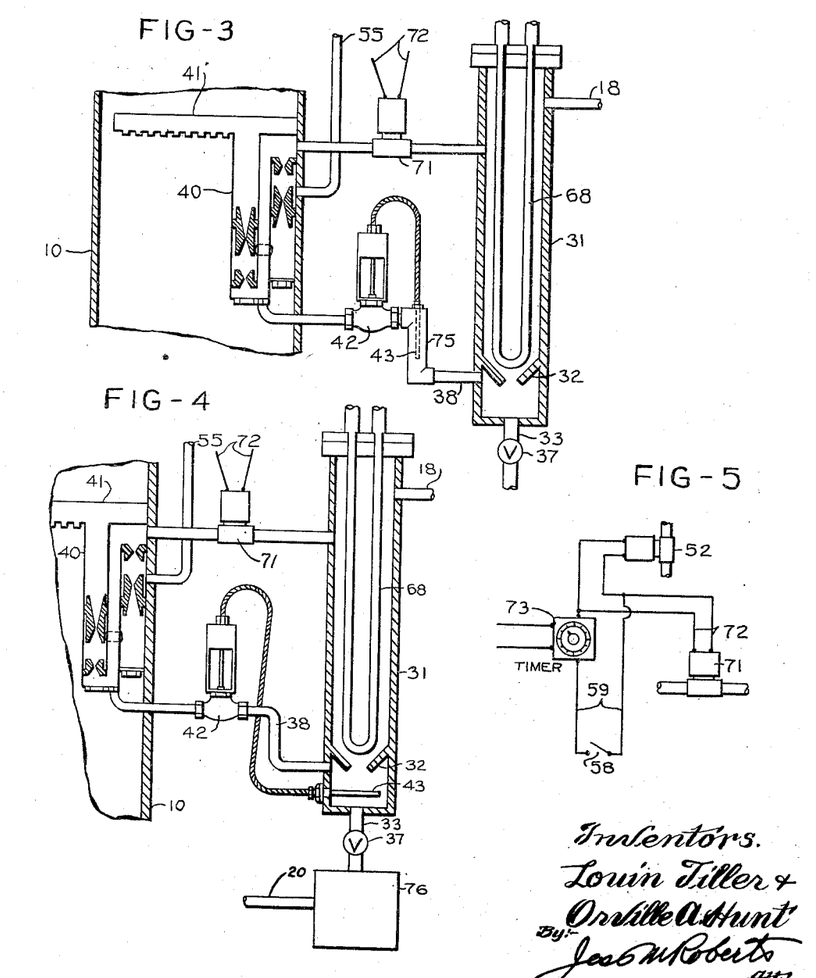
Fig. 3 is a fragmentary diagrammatic view showing a modification of the arrangement shown in Fig. 1.
Fig. 4 is a view similar to Fig. 3 showing another modification of the invention.
Fig. 5 is a diagram showing how a timer can be used in Fig. 1.

In some practices of the invention both the solenoid valves 52 and 71 will be operated intermittently by a suitable timer whenever the mercury switch 58 is closed, as taught in our previously mentioned copending application. Fig. 5 shows such a timer 73, which timer, for example, may be adapted to divide a thirty-second interval of time into an open valve period and a closed valve period in any proportion desired. For instance, the timer may be adjusted for repeated cycles of 10 seconds of flow followed by 20 seconds of no flow through both valves.

Modifications of the arrangement shown in Fig. 1

Figs. 3 and 4 show the thermostat bulb in other positions upstream from the thermostatic valve 42. These two figures are similar to Fig. 1 as indicated by the use of corresponding numerals to indicate corresponding parts.

In Fig. 3 the thermostat bulb 43 is in the pipe 38 between the separator 31 and the valve 42, the pipe 38 being considered as a part of the return line 18. For this purpose the pipe 38 is provided with a special fitting 75 to receive the thermostat bulb 43.

In Fig. 4 the thermostat bulb 43 is positioned inside the separator 31. The thermostat bulb may be placed in any location inside the steam separator but is shown in the drawing in a position just below one of the separator baffles 32. Fig. 4 also illustrates how a trap 76 may be used instead of the pump 35 to remove condensate from the return line. Condensate drains into the trap and is periodically discharged by the trap for disposal or for return to the boiler as may be desired.

The temperature adjustment of the thermostatic valve 42 in the arrangement shown in Figs. 3 and 4 will be close to the adjustment employed in Fig. 1. In any given installation, the temperature adjustment of the thermostatic valve will depend in part on the amount of make-up water per hour required by the system. In each instance, however, the proper adjustment of the thermostatic valve 42 for a high rate of heat output to the material in process may be readily ascertained by trial and error.

In the forms of the invention described to this point, care is taken that the thermostat bulb be acted upon by substantially the temperature of steam at whatever pressure prevails in the return line. If the presence of non-condensible gases is at a minimum the temperature acting on the thermostat will be very close to the steam temperature corresponding to the return line pressure. If considerable non-condensible gas is in the steam of a trap system to which this invention is applied, the temperature of the vapor in the return line will be depressed and the thermostatic control may be adjusted to compensate for the lower temperature.

One thing that should be avoided is the flooding or submersion of the thermostat bulb by stagnant condensate at a temperature below the setting of the thermostatic valve. If the return lines are short or if the return velocity is high so that condensate therein is always close to the theoretical temperature of steam at the return line pressure, there may be no need for removing condensate from the return line independently of the thermostatic valve. There is less need in an orifice system than in a trap system.

It may be readily understood then that the arrangement shown in Fig. 1 may be operated with the valve 37 closed and the pump 35 idle. In fact, this arrangement is especially favorable for such operation because when valve 37 is closed, the separator 31 provides a temporary storage space downstream from the thermostat bulb for the accumulation of condensate. The thermostatic valve would open often enough for flushing action on the storage space to keep the accumulated condensate from rising to the level of the thermostat bulb.

Figure 6:
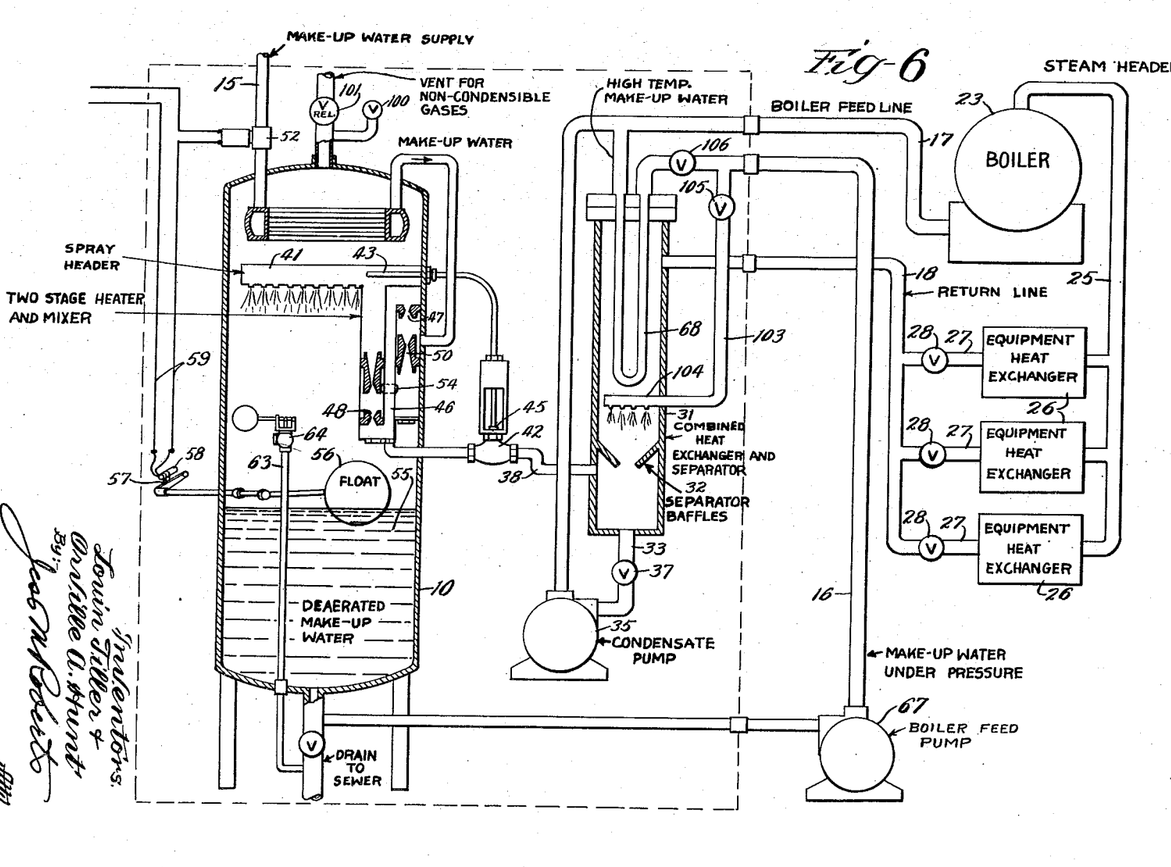
Fig. 6 is a diagram similar to Fig. 1 with the thermostatic valve downstream from the release valve that it controls.

*The form of the invention shown in Fig. 6*

The purpose of Fig. 6 is to illustrate those practices of our invention in which the thermostat that controls the release valve at the end of the return line is positioned downstream from the valve to be heated by the fluid from the return line that is discharged by the valve. The major portion of the structure shown in Fig. 6 is similar to the structure shown in Fig. 1 as indicated by the use of corresponding numerals to indicate corresponding parts. The tank 10 instead of being at substantially atmospheric pressure is preferably maintained at a few pounds above atmospheric pressure, say, 5 lbs. gauge, so that the temperature inside the tank will readily respond to any cooling of the interior of the tank since such cooling action will condense vapor to reduce the pressure in the tank. To this end the tank is of closed construction and is provided with a throttling valve or vent valve 100 and a relief valve 101. The vent valve 100 is adjusted at a slightly open position sufficient to maintain pressure in the tank on the order of, say 3 or 4 lbs. gauge, and the relief alve 101 may be set to open say, at 8 or 10 lbs. pressure.

To maintain pressure in the tank 10 it is necessary to control the release of fluid through the overflow pipe 63. For this purpose Fig. 6 shows the overflow pipe 63 normally closed by a float valve 64. Whenever make-up water rises high enough to open the float valve 64 the valve opens automatically to release overflow to the drain.

It will be noted that certain parts shown in Fig. 1 are omitted in Fig. 6 including the pipe 70, solenoid valve 71, and the wires 72. The thermostat 43 of the valve 42 is shown positioned in the two-stage combined heater and mixer 40 near the outlet thereof adjacent the spray head 41.

It is contemplated that the discharge capacity of the spray head 41 will always be so limited relative to the input of fluid that the pressure in the spray head will rise substantially above the pressure prevailing in the tank 10 when the thermostatic valve 42 is open.

The thermostat arrangement is such that the valve 42 opens in response to decrease in temperature of the thermostat bulb 43 and closes in response to increase in temperature of the bulb. The critical temperature at which the valve opens and closes may be varied by the manual adjustment 45 and is set at some temperature above the temperature prevailing in the tank 10. Thus the tank provides an environment for the thermostat bulb that tends to cool the bulb below its critical temperature when the spray head 41 is not in operation.

The manner in which the steam system shown in Fig. 6 operates may be readily understood.

At the master control unit four major causes are in effect for sustaining flow velocity throughout the steam system. In the first place, the continuous removal of condensate by the pump 35 from the lower end of the separator 31 creates flow in the return line. In the second place, the condensing of steam in the separator 31 by the cooling effect of the water coil 68 and/or by the cooling effect of water introduced by the spray head 104 serve to promote flow by contraction of the fluid mixture at the end of the return line. In the third place, the release of steam by opening of the thermostatic valve 42 causes flow throughout the system; and in the fourth place, the cooling effect of new make-up water flowing through the vent condenser 53 reduces the temperature and pressure in the tank 10, thereby tending to cool the thermostat 43 for opening action of the thermostatic valve 42.

The adjustment 45 of the thermostatic valve 42 is high enough to make the valve open in an intermittent manner thereby to cause pulsating flow throughout the system. In a steam system having approximately 100 lbs. per square inch gauge pressure in the steam header 25, the setting of the thermostat valve may be, for example, about 230° F. Since the master control tank is at atmospheric pressure, the tank interior cannot rise above 212° F. so the environment of the spray header 41 tends to cool the thermostat bulb below 230° F. thereby to cause the thermostat valve 42 to open. When the valve 42 opens, however, the thermostat bulb is again heated above its critical temperature of 230° F. by the fluid released from the separator 31 thereby causing the thermostatic valve to close.

Since a temperature of 230° F. cannot be attained in the spray head 41 at atmospheric pressure, the initial flow of steam from the valve or the initial formation of steam by flash action from condensate released through the valve does not have a temperature above 212° F. As soon as the restrictive action of the spray openings is effective to cause rising back pressure in the spray header, however, the temperature rises correspondingly and soon climbs above the critical temperature 230° F. It is apparent then, that the flow passage from the thermostat valve 42 to the spray openings comprising the two-stage heater 40 and the spray head 41 functions as a pressure accumulation space to make possible the relatively high temperature required for the purpose of valve control as well as for the purpose of deaerating the make-up water.

By virtue of the described cycle of alternate heating and cooling, the valve 42 opens intermittently in an automatic manner to maintain a desired minimum average flow velocity in the system during periods when no new make-up water is flowing. Whenever new make-up water is required, and the float 56 lowers to open the water valve 52, the thermostat bulb 43 is immediately cooled below its critical temperature. In the usual method of operation, the flow of new water is adequate to keep the thermostat valve 42 open in opposition to the heating effect of the fluid released by the valve, so that the thermostatic valve stays open as long as the flow of new water continues.

The valve 42 may completely close or only nearly close in response to rising temperature, and the valve may be either a quick-acting valve or a slow-acting valve. If a slow-acting valve is used, it will tend to stay open at an equilibrium position in the absence of water flow and will merely open wider in response to new water. In such instances, the pulsations in the system are governed primarily by the periods of water flow. Since every steam system has losses, however, which must be made up by new water, the new water demand can be relied upon to continually cause opening action of the valve 42 to create pulsations.

Since the master control responds to demand for new water at the boiler end of the system and in doing so speeds up velocity at the return end of the system, the unit may be said to tie the two ends of the system together functionally. The result is a closed chain of causes in which the demand of the boiler for a pound of water to replace a pound of steam consumed in the system causes enough velocity to be created to sweep out the resulting condensate from the steam chests in the system.

When the load on the steam system is steady the master control unit functions as automatic means to keep the overall or average velocity of the pulsating flow at a substantially constant level. Under constant operating conditions, with the average velocity level of the pulsating flow substantially constant, the boiler demand for new water will be met by a substantially constant ratio of new water to condensate. Under such circumstances if velocity were to tend to lag, there would be an immediate deficit in condensate returned and the demand for make-up water would temporarily increase. Such increase in the demand for make-up water would, however, act on the thermostat bulb 42 to increase velocity. Thus, any tendency for velocity to drop would be automatically corrected. In like manner any tendency for velocity to speed up excessively, would be automatically corrected by reducing the demand for make-up water and thereby reducing the quantity of fluid released by the valve 42.

Since changes in the load on the steam system cause corresponding changes in the demand for new water by the boiler with corresponding changes in the quantity of make-up water required in a unit of time, it is apparent that the average or overall velocity of the system also shifts up and down automatically with changes in the load on the system.

Each time the valve 42 opens, it causes two things to happen. It causes a pressure pulsation or slight pressure drop in every steam chest in the system, and it causes velocity in the whole system to speed up. In other words, each opening movement of the valve 42 causes a pressure pulsation in each piece of equipment and at the same time causes a strong surge of flow from the equipment through the return line of the system. The pressure pulsations attack the non-condensible gas films in the steam chests by causing a flashing action because each time the pressure drops slightly, a portion of every particle of water in the steam chests flashes into steam. There are countless water particles in and near the gas films and at 100 lbs. pressure per square inch the condensate that flashes into steam increases in volume over 240 times. As a result, each particle of water becomes an explosive center of turbulence to disrupt the gas films and to promote heat transfer to the material in process. The gases torn away from the gas films are quickly picked up by the velocity surges and swept into and through the return line of the system. The velocity surges also sweep condensate out of the steam chests continuously and keep the condensate films exceedingly thin.

*Tuning the unit to suit a particular steam system*

A feature of the invention is that it incorporates a number of elements that may be changed or adjusted to cause the master control unit to match precisely the requirements of any steam system within a very wide range. As a result, the control unit is extremely flexible and is not only readily adaptable to the requirements of any particular system but is also adaptable to changes in a steam system such as the addition of new heating equipment. In the arrangement shown in Fig. 6, for example, any number of the following adjustments may be made to vary the operation and control characteristics of the unit:

1. The temperature adjustment 45 of the thermostatic valve 42 may be varied.

2. The rate of supply of the new water may be varied to change the cooling effect of the new water on the bulb 43. For example, the float valve 52 may be restricted or limited in its opening action to any degree desired.

3. The closing action of the thermostatic valve 42, as well as the opening action, may be limited to any degree desired.

4. The discharge capacity of the spray head 41 may be varied to vary the manner and degree of pressure rise in the spray head. To this end the spray openings may be varied in number or varied in size.

5. The pressure in the master control tank 10 may be raised or lowered to increase or decrease the prevailing temperature in the tank.

The term "steam supply" in the claims is to be understood as broad enough to cover exhaust steam supplied by an engine or other source.

Our description in detail of selected practices of the invention for the purpose of disclosure and to illustrate the principles involved will suggest to those skilled in the art various changes and substitutions under our basic concept. We reserve the right to all such departures from our disclosure that fall within the scope of our appended claims.

We claim as our invention:

1. In a steam system having a boiler, at least one steam-using device connected to the boiler, and a return line connecting the steam-using device to the boiler and closed to the outer atmosphere, said device and return line forming a clear channel from said boiler for flow-promoting pressure communication through the system, the combination therewith of: a condensate pump in the return line for returning condensate to said boiler under pressure, said pump having its intake port in direct communication with said return line to promote flow of steam through the steam-using device, a valve to release fluids from said return line into a region of substantially lower pressure than the return line to set up a pressure differential across the system for additional promotion of flow in the steam system, and a thermostat controlling said valve, said thermostat being positioned for rise in temperature by heat supplied by said return line.

2. In a steam system having a boiler, at least one steam-using device connected to the boiler, and a return line connecting the steam-using device to the boiler and closed to the outer atmosphere, said device and return line forming a clear channel from said boiler for flow-promoting pressure communication through the system, the combination therewith of: a valve to release fluid from said return line into a region of substantially lower pressure than the return line to set up a pressure differential across the system for promoting flow of steam through the steam-using device, a thermostat controlling said valve, said thermostat being positioned for rise in temperature by heat supplied by said return line, and means operatively connected with the return line to bring cooling fluid into heat-exchange relation with the contents of said return line for causing condensation of steam therein to create a further pressure differential for further promotion of flow in the system.

3. In a steam system having a boiler, at least one steam-using device connected to the boiler, and a return line connecting the steam-using device to the boiler and closed to the outer atmosphere, said device and return line forming a clear channel from said boiler for flow-promoting pressure communication through the system, the combination therewith of: means operatively connected with the return line to bring cooling fluid into heat-exchange relation with the contents of said return line for causing condensation of steam therein to set up a pressure differential across the system for promotion of flow of steam through the steam-using device, a condensate pump in the return line for returning condensate to said boiler, said condensate pump having its intake port in direct communication with said return line to remove condensate therefrom for further promotion of flow in the system, a valve to release fluid from said return line into a region of substantially lower pressure than the return line to set up a still further pressure differential across the system for still further promotion of flow in the steam system, and a thermostat controlling said valve, said thermostat being positioned for rise in temperature by heat supplied by said return line.

4. In a steam system having a boiler, at least one steam-using device, and a return line, said device and return line forming a clear channel from said boiler for flow-promoting pressure communication through the system, the combination therewith of: a condensate pump having its intake port connected with said return line to promote flow in the system and having its discharge port under higher pressure than the return line, a valve to release fluid from said return line for further promotion of flow in the steam system, and a thermostat operatively connected to said valve for opening action of the valve in response to temperature above a given level and closing action in response to temperature below said level, said thermostat being in heat-exchange relation with fluid in said return line upsteam from said valve, said temperature level being below the temperature of said steam supply.

5. In a steam system having a boiler, at least one steam-using device connected to the boiler, and a return line connecting the steam-using device to the boiler and closed to the outer atmosphere, said device and return line forming a clear channel from said boiler for flow-promoting pressure communication through the system, the combination therewith of: a condensate pump in the return line having its intake port directly connected with said return line to promote flow of steam through the steam-using device and having its discharge port under higher pressure than the return line, a valve to release fluid from said return line for further promotion of flow in the steam system, and a thermostat operatively connected to said valve for opening action of the valve in response to temperature above a given level and closing action in response to temperature below said level, said thermostat being in heat-exchange relation with the fluid discharge from said valve for rise in temperature by heat supplied by said return line.

6. In a steam system having a boiler, at least one steam-using device, and a return line, said device and return line forming a clear channel from said boiler for flow-promoting pressure communication through the system, the combination therewith of: a heat exchanger included in said return line having a passage for heating water, a valve to release fluid from said return line to promote flow in the system, a thermostat operatively connected with said valve for opening action of the valve in response to temperatures above a given level and closing action in response to temperatures below said level, said level being lower than the temperature of the steam supply, said thermostat being positioned for rise in temperature by heat supplied by said return line, a boiler feed line under pressure higher than the pressure in said return line, said boiler feed line including said passage in the heat exchanger to cause condensation in said return line for further promotion of flow in the system, and a pump having its intake side connected with said return line to continually remove condensate therefrom, said pump having its discharge side connected with said boiler feed line.

7. In a steam system, a combination as set forth in claim 6, in which said thermostat is in heat-exchange relation with the fluid discharge from said valve for rise in temperature by heat supplied by said return line.

8. In a steam system having a boiler, at least one steam-using device, and a return line, said device and return line forming a clear channel from said boiler for flow-promoting pressure communication through the system, the combination therewith of: a separator included in said return line, a valve to release fluid from said separator to promote flow in the steam system, a thermostat operatively connected to said valve for opening action of the valve in response to temperature above a given level and closing action in response to temperature below said level, said thermostat being in heat-exchange relation with returns from the system upstream from said valve, and a condensate return pump having its intake side connected with said separator for further promotion of flow in the system.

9. In a steam system, a combination as set forth in claim 8, in which said thermostat is in heat-exchange relation with the fluid discharge from said valve for rise in temperature by heat supplied by said return line.

10. In a steam system, a combination as set forth in claim 9, in which said thermostat is in a passage to receive the discharge from said valve, said passage having restricted outlet capacity to cause the pressure therein to rise when said valve is open, and in which said thermostat is in said passage.

11. In a steam system, a combination as set forth in claim 9, which includes means to cool the interior of said separator with boiler feedwater to further promote flow in the steam system.

12. In a steam system having a boiler, at least one steam-using device, and a return line, said device and return line forming a clear channel from said boiler for flow-promoting pressure communication through the system, the combination therewith of: a valve to release fluid from said return line to promote flow in the system, a thermostat operatively connected to said valve for opening action of the valve in response to temperature above a given level and closing action in response to temperature below said level, said thermostat being in heat-exchange relation with fluid in said return line upstream from said valve, said temperature level being below the temperature of said steam supply, and means to remove condensate from said return line at a rate to prevent accumulation of condensate at said thermostat.

13. In a steam system having a boiler, at least one steam-using device, and a return line, said device and return line forming a clear channel from said boiler for flow-promoting pressure communication through the system, the combination therewith of: a valve to release fluid from said return line to promote flow in the system, a thermostat operatively connected to said valve for opening action of the valve in response to temperature above a given level and closing action in response to temperature below said level, said thermostat being in heat-exchange relation with fluid in said return line upstream from said valve, said temperature level being below the temperature of said steam supply, a boiler feed line under pressure higher than the pressure in said return line, and a pump having its intake side connected with said return line to continually remove condensate therefrom for further promotion of flow in the system, said pump having its discharge side connected with said boiler feed line.

14. In a steam system having a boiler, at least one steam-using device, and a return line, said device and return line forming a clear channel from said boiler for flow-promoting pressure communication through the system, the combination therewith of: a heat exchanger included in said return line having a passage for heating water, a valve to release fluid from said return line to promote flow in the system, a thermostat operatively connected with said valve for opening action of the valve in response to temperatures above a given level and closing action in response to temperatures below said level, said level being lower than the temperature of the steam supply, said thermostat being positioned to be heated by fluid in the return line upstream from said heat exchanger, and means to remove condensate from said return line at a rate to prevent accumulation of condensate at said thermostat.

15. In a steam system, a combination as set forth in claim 14, in which said thermostat is positioned inside said heat exchanger.

16. In a steam system, a combination as set forth in claim 14, in which said valve is downstream from said heat exchanger and said thermostat is positioned between the heat exchanger and the valve.

17. In a steam system having a boiler, at least one steam-using device, and a return line, said device and return line forming a clear channel from said boiler for flow-promoting pressure communication through the system, the combination therewith of: a separator included in said return line, a valve to release fluid from said separator to promote flow in the system, a thermostat operatively connected to said valve for opening action of the valve in response to temperature above a given level and closing action in response to temperature below said level, said thermostat being in heat-exchange relation with returns from the system upstream from said valve, said temperature level being below the temperature of said steam supply, and means to remove condensate from said separator at a rate to prevent accumulation of condensate at said thermostat.

18. In a steam system, a combination as set forth in claim 17, in which said separator has means for circulating a cooling fluid therethrough to cause condensation therein.

19. In a steam system having a boiler, at least one steam-using device, and a return line, said device and return line forming a clear channel from said boiler for flow-promoting pressure communication through the system, the combination therewith of: a water storage tank, means including a valve to release fluid from said return line to heat water for said storage tank and to promote flow in the system, a thermostat operatively connected to said valve for opening action of the valve in response to temperature above a given level and closing action in response to temperature below said level, said thermostat being in heat-exchange relation with returns from the system upstream from said valve, said temperature level being below the temperature of said steam supply, a boiler feed line under pressure higher than the pressure in said return line, a pump having its intake side connected with said return line to continually remove condensate therefrom for further promotion of flow in the system, said pump having its discharge side connected with said boiler feed line, a heat exchanger included in said return line having a water-heating passage connected with said boiler feed line, and means including a second pump to force water from said tank through said passage into said boiler feed line thereby to cause condensation in said return line for still further promotion of flow in the system.

20. In a steam system, a combination as set forth in claim 19, including means to supply new water to said storage tank and a second valve to release steam from said return line automatically when said supply means operates.

21. A steam-heating system having a plurality of steam-using devices with a steam supply and a return line closed to the outer atmosphere and connecting the devices with the supply for return of steam thereto valve means to release fluid from said return line to maintain flow in the system, and a thermostat operatively connected with said valve for opening action of the valve in response to temperatures in said return line above a given temperature and for closing action of the valve in response to temperatures below the given temperature, said given temperature being lower than the prevailing temperature on the supply side of the system.

ORVILLE A. HUNT.
LOUIN TILLER.

REFERENCES CITED

The following references are of record in the file of this patent:

UNITED STATES PATENTS

| Number | Name | Date |
| --- | --- | --- |
| 2,366,332 | Harrison et al. | Jan. 2, 1945 |